(12) United States Patent
Zhang et al.

(10) Patent No.: US 11,192,547 B2
(45) Date of Patent: Dec. 7, 2021

(54) ADAPTIVE SPEED CONTROL SYSTEM

(71) Applicant: Aptiv Technologies Limited, St. Michael (BB)

(72) Inventors: Guoguang Zhang, Kokomo, IN (US); Santhosh Tamilarasan, Carmel, IN (US); Tanto Sugiarto, West Lafayette, IN (US)

(73) Assignee: Aptiv Technologies Limited, St. Michael (BB)

( * ) Notice: Subject to any disclaimer, the term of this patent is extended or adjusted under 35 U.S.C. 154(b) by 177 days.

(21) Appl. No.: 16/671,350

(22) Filed: Nov. 1, 2019

(65) Prior Publication Data
US 2021/0129840 A1    May 6, 2021

(51) Int. Cl.
| | |
|---|---|
| *B60W 30/14* | (2006.01) |
| *B60W 10/04* | (2006.01) |
| *B60W 10/18* | (2012.01) |
| *G05D 1/00* | (2006.01) |

(52) U.S. Cl.
CPC .......... *B60W 30/143* (2013.01); *B60W 10/04* (2013.01); *B60W 10/18* (2013.01); *G05D 1/0088* (2013.01); *B60W 2420/42* (2013.01); *B60W 2420/52* (2013.01); *B60W 2540/30* (2013.01); *B60W 2554/4041* (2020.02); *B60W 2554/804* (2020.02); *B60W 2720/106* (2013.01); *G05D 2201/0213* (2013.01)

(58) Field of Classification Search
CPC .......... B60W 30/143; B60W 2540/30; B60W 2720/106; B60W 30/095; G05D 1/0088; G05D 2201/0213
See application file for complete search history.

(56) References Cited

U.S. PATENT DOCUMENTS

| | | | |
|---|---|---|---|
| 6,496,108 B1 | 12/2002 | Baker et al. | |
| 8,260,515 B2 | 9/2012 | Huang et al. | |
| 8,287,055 B2 | 10/2012 | Lee | |
| 2008/0167820 A1 | 7/2008 | Oguchi et al. | |
| 2010/0023245 A1 | 1/2010 | Huang et al. | |
| 2014/0371981 A1* | 12/2014 | Nordbruch | G06K 9/00845 701/36 |

(Continued)

FOREIGN PATENT DOCUMENTS

| | | | |
|---|---|---|---|
| CN | 110386139 A | * 10/2019 | ............ B60W 30/14 |
| DE | 102011100277 | 11/2012 | |
| DE | 102016215528 | 2/2018 | |

OTHER PUBLICATIONS

Remman et al, "Cut-in Scenario Prediction for Automated Vehicles", Sep. 2018, IEEE (Year: 2018).*

(Continued)

*Primary Examiner* — Peter D Nolan
*Assistant Examiner* — Kenneth M Dunne
(74) *Attorney, Agent, or Firm* — Colby Nipper PLLC

(57) ABSTRACT

A system includes a controller circuit configured to monitor, while a host vehicle is operated in a manual driving mode, a speed change response of an operator of the host vehicle based on a movement of a first vehicle traveling on a roadway, identify at least one speed parameter based on the speed change response, and apply, when the host vehicle is controlled in an autonomous driving mode, the at least one speed parameter based on the movement of a second vehicle traveling on the roadway.

29 Claims, 10 Drawing Sheets

(56) References Cited

U.S. PATENT DOCUMENTS

| | | | |
|---|---|---|---|
| 2016/0046290 A1* | 2/2016 | Aharony | B60W 10/20 |
| | | | 701/41 |
| 2016/0052514 A1* | 2/2016 | Clarke | G06T 7/70 |
| | | | 701/28 |
| 2017/0217428 A1* | 8/2017 | Tan | B60W 10/18 |
| 2018/0046193 A1* | 2/2018 | Takada | B60W 30/095 |
| 2018/0141568 A1* | 5/2018 | Singhal | G05D 1/0276 |
| 2019/0176821 A1* | 6/2019 | Hsu | B60W 30/16 |
| 2019/0329779 A1* | 10/2019 | D'sa | B60W 60/00276 |
| 2020/0156626 A1* | 5/2020 | Mamchuk | B60W 10/20 |
| 2021/0110484 A1* | 4/2021 | Shalev-Shwartz | B60W 10/20 |

OTHER PUBLICATIONS

European Search Report, dated Jun. 24, 2021, European Patent Office, whole document (Year: 2021).*

European Opinion Report, dated Jun. 24, 2021, European Patent Office, whole document (Year: 2021).*

* cited by examiner

ADAPTIVE SPEED CONTROL SYSTEM

TECHNICAL FIELD OF DISCLOSURE

This disclosure generally relates to a vehicle speed control system.

BACKGROUND OF THE DISCLOSURE

Driver assistance systems typically have factory programmed responses that may not control a vehicle in a same manner as an operator. Actions by the system, such as braking and accelerating, may be too aggressive and/or too conservative compared to the operator's typical driving habits.

SUMMARY OF THE DISCLOSURE

An example of an adaptive vehicle control system includes a controller circuit configured to monitor, while a host vehicle is operated in a manual driving mode, a speed change response of an operator of the host vehicle based on a movement of a first vehicle traveling on a roadway; identify at least one speed parameter based on the speed change response; and apply, when the host vehicle is controlled in an autonomous driving mode, the at least one speed parameter based on the movement of a second vehicle traveling on the roadway.

In an example having one or more features of the vehicle control system of the previous paragraph, the at least one speed parameter is one of a timing and a speed rate of change.

In an example having one or more features of the vehicle control system of any of the previous paragraphs, the vehicle control system of the previous paragraph, the controller circuit determines the timing based on the operator adjusting a speed control actuator of the host vehicle.

In an example having one or more features of the vehicle control system of any of the previous paragraphs, the speed control actuator is one of a brake pedal, an accelerator pedal, and a cruise control switch.

In an example having one or more features of the vehicle control system of any of the previous paragraphs, the controller circuit further determines an actuation severity level of the operator adjusting the speed control actuator.

In an example having one or more features of the vehicle control system of any of the previous paragraphs, the system further includes an occupant recognition system and the controller circuit applies the at least one speed parameter based on a recognition of occupants of the host vehicle.

In an example having one or more features of the vehicle control system of any of the previous paragraphs, the controller circuit monitors the speed change response when the controller circuit determines that the first vehicle, traveling ahead of the host vehicle, moves from a travel lane traveled by the host vehicle into an adjacent lane.

In an example having one or more features of the vehicle control system of any of the previous paragraphs, the controller circuit monitors the speed change response when the controller circuit determines that the first vehicle, traveling ahead of the host vehicle in an adjacent lane, moves from the adjacent lane into a travel lane traveled by the host vehicle.

In an example having one or more features of the vehicle control system of any of the previous paragraphs, the system further includes a camera in communication with the controller circuit; the camera capturing images of the roadway traveled by the host vehicle; and wherein the controller circuit is further configured to determine that the first vehicle enters the travel lane based on the images.

In an example having one or more features of the vehicle control system of any of the previous paragraphs, the system further includes a ranging sensor in communication with the controller circuit. The controller circuit is further configured to determine a longitudinal distance between the host vehicle and the first vehicle based on the ranging sensor, and adjust the overlap threshold based on the longitudinal distance.

In an example having one or more features of the vehicle control system of any of the previous paragraphs, the first distance threshold is adjusted between a lower limit and a upper limit based on a longitudinal distance between the host vehicle and the first vehicle.

In an example having one or more features of the vehicle control system of any of the previous paragraphs, the controller circuit determines a aggressiveness index of the operator by the equation, $$AGG_{index} = \frac{|a_{bsc}| - |a_{opr}|}{\max(|a_{bsc}|, |a_{opr}|)}.$$

In an example having one or more features of the vehicle control system of any of the previous paragraphs, the controller circuit determines an aggressiveness level of the operator by the equation, $$AGG_{level} = \text{round } [10\times(AGG_{index}+0.5)].$$

In an example having one or more features of the vehicle control system of any of the previous paragraphs, the controller circuit stores a plurality of aggressiveness levels in a memory of the controller circuit and applies at least one of the plurality of aggressiveness levels when the host vehicle is controlled in the autonomous driving mode.

In an example having one or more features of the vehicle control system of any of the previous paragraphs, the controller circuit monitors the speed change response when the controller circuit determines that the first vehicle is traveling in a merge lane adjacent to a travel lane traveled by the host vehicle.

In an example having one or more features of the vehicle control system of the previous paragraph, the first vehicle is overtaking the host vehicle from behind.

In an example having one or more features of the vehicle control system of any of the previous paragraphs, the system further includes a merge lane detector and a ranging sensor in communication with the controller circuit; the merge lane detector determining a presence of the merge lane adjacent to the travel lane; the ranging sensor detecting a range and a range rate of the first vehicle in the merge lane; and wherein the controller circuit is further configured to: determine that the first vehicle will merge into the travel lane based on the merge lane detector and the ranging sensor.

In an example having one or more features of the vehicle control system of any of the previous paragraphs, the merge lane detector is a digital map that indicates the merge lane.

In an example having one or more features of the vehicle control system of any of the previous paragraphs, the merge lane detector is a camera that indicates the merge lane based on images of lane markings on the roadway.

In an example having one or more features of the vehicle control system of any of the previous paragraphs, the controller circuit further determines a buffer zone directly behind the host vehicle; the buffer zone comprising an area extending laterally into the merge lane from a rear of the host vehicle to a distance threshold along a longitudinal axis of the host vehicle.

In an example having one or more features of the vehicle control system of any of the previous paragraphs, the controller circuit further determines a time in which the first vehicle will enter the buffer zone based on the range and the range rate.

In an example having one or more features of the vehicle control system of any of the previous paragraphs, when the time in which the first vehicle will enter the buffer zone is greater than a time threshold, the controller circuit increases the distance threshold such that the time in which the first vehicle will enter the buffer zone is equal to the time threshold.

In an example having one or more features of the vehicle control system of any of the previous paragraphs, the controller circuit stores a plurality of distance thresholds in a memory of the controller circuit and applies at least one of the plurality of distance thresholds when the host vehicle is controlled in the autonomous driving mode.

In an example having one or more features of the vehicle control system of any of the previous paragraphs, the controller circuit is further configured to apply the at least one speed parameter when the operator is an occupant of another vehicle controlled in the autonomous driving mode.

An example of a method of operating a vehicle speed control system includes monitoring, with controller circuit while a host vehicle is operated in a manual driving mode, a speed change response of an operator of the host vehicle based on a movement of a first vehicle traveling on a roadway; identifying, with the controller circuit, at least one speed parameter based on the speed change response; and applying, with the controller circuit, when the host vehicle is controlled in an autonomous driving mode, the at least one speed parameter based on the movement of a second vehicle traveling on the roadway.

In an example having one or more features of the method of operating a vehicle speed control system of the previous paragraph, the at least one speed parameter is one of a timing and a speed rate of change.

In an example having one or more features of the method of operating a vehicle speed control system of the previous paragraphs, the controller circuit determines the timing based on the operator adjusting a speed control actuator of the host vehicle.

In an example having one or more features of the method of operating a vehicle speed control system of the previous paragraphs, the speed control actuator is one of a brake pedal, an accelerator pedal, and a cruise control switch.

Another example of an adaptive vehicle control system includes a means for monitoring, while a host vehicle is operated in a manual driving mode, a speed change response of an operator of the host vehicle based on a movement of a first vehicle traveling on a roadway; a means for identifying at least one speed parameter based on the speed change response; and a means for applying, when the host vehicle is controlled in an autonomous driving mode, the at least one speed parameter based on the movement of a second vehicle traveling on the roadway.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
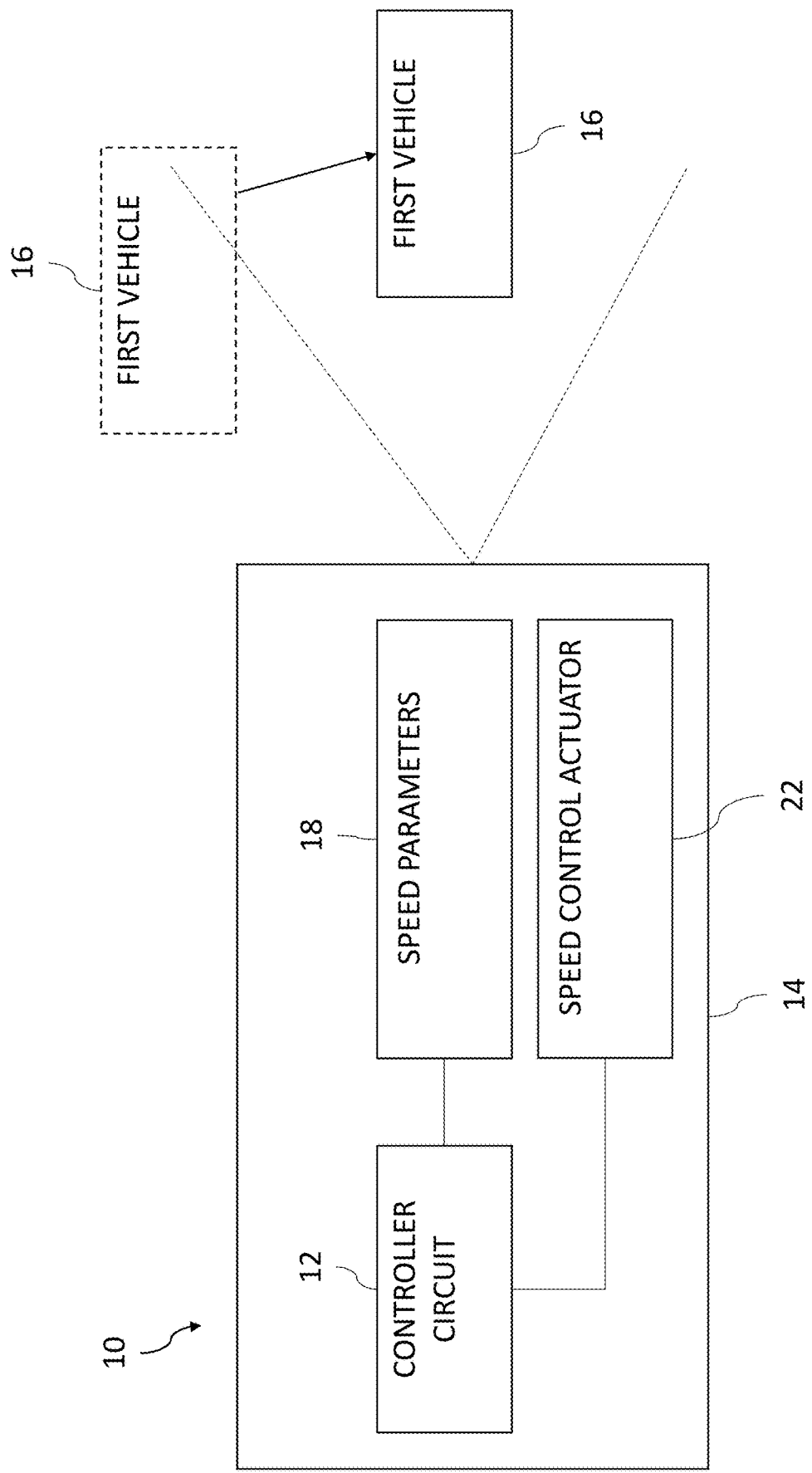
FIG. 1 is an illustration of a speed control system in accordance with one embodiment.

FIG. 1 illustrates a speed control system 10, hereafter the system 10. The system 10 is an improvement over other systems, because the system 10 learns a driver's preference for speed control. The system 10 includes a controller circuit 12 configured to monitor a speed change response of an operator of a host vehicle 14, based on a movement of a first vehicle 16 traveling on a roadway. That is, the controller circuit 12 monitors the operator changing a speed of the host vehicle 14, and associates the operator's response with the movement of the first vehicle 16. The speed change response may be an increase in speed (i.e., an acceleration), and/or a decrease in speed (i.e., a deceleration). The movement of the first vehicle 16 may be a lane change, or an impending or anticipated lane change, as will be described in more detail below. The controller circuit 12 monitors and learns the speed change response of the operator while the host vehicle 14 is operated in a manual driving mode (the learning phase), then applies this learned behavior while the host vehicle 14 is operated in an autonomous driving mode under similar traffic scenarios. Benefits of the system 10 are described herein using traffic scenarios where the first vehicle 16 cuts into a travel lane (i.e., a cut-in maneuver) ahead of the host vehicle 14 where the machine learning by the system 10 may be characterized as reactive learning, and where the first vehicle 16 performs a lane merge maneuver where the machine learning by the system 10 may be characterized as anticipatory learning. In an example, the reactive learning is executed when perception sensors (e.g., camera, radar, LiDAR, etc.) on the host vehicle 14 indicate that the first-vehicle 16 is crossing the lane boundary and is confirmed by the operator's action (e.g. applying the brakes). In an example, the anticipatory learning is executed prior to the perception sensors detecting the lane merge maneuver, and is executed when a perceived or anticipated trajectory of the first vehicle 16 indicates that the first vehicle 16 will merge in the future, and it is also confirmed by operator's action (e.g. applying the brakes). It will be appreciated that the system 10 may be applied to other traffic scenarios besides the cut-in and lane merge maneuvers, and may also employ any of the known machine learning algorithms.

Machine learning is a data analytics technique that teaches computers to learn from experience. Machine learning routines, or algorithms, use computational methods to learn information from data without relying on a predetermined equation as a model. The routines improve their performance as the samples size available for learning increases. Machine learning uses two types of techniques: supervised learning, which trains a model on known input and output data so that it can predict future outputs, and unsupervised learning, which finds hidden patterns or intrinsic structures in input data. Supervised learning uses classification and regression techniques to develop predictive models. Common algorithms for performing classification include support vector machine (SVM), boosted and bagged decision trees, k-nearest neighbor, Naïve Bayes, discriminant analysis, logistic regression, and neural networks. Common regression algorithms include linear model, non-linear model, regularization, stepwise regression, boosted and bagged decision trees, neural networks, and adaptive neuro-fuzzy learning. Unsupervised learning finds hidden patterns or intrinsic structures in data. It is used to draw inferences from datasets consisting of input data without labeled responses. Clustering is a common unsupervised learning technique. Common algorithms for performing clustering include k-means and k-medoids, hierarchical clustering, Gaussian mixture models, hidden Markov models, self-organizing maps, fuzzy c-means clustering, and subtractive clustering.

The host vehicle 14 may be characterized as an automated vehicle. As used herein, the term automated vehicle may apply to instances when the host vehicle 14 is being operated in the automated driving mode, i.e. a fully autonomous driving mode, where the operator of the host vehicle 14 may do little more than designate a destination to operate the host vehicle 14. The host vehicle 14 may also be operated in the manual driving mode where the degree or level of automation may be little more than providing an audible or visual warning to the human operator who is generally in control of the steering, accelerator, and brakes of the host vehicle 14. For example, the system 10 may merely assist the operator as needed to change lanes and/or avoid interference with and/or a collision with, an object such as another vehicle, a pedestrian, or a road sign. The manual driving mode may include semi-automated driver assistance features, such as lane keeping, cruise control, and collision avoidance.

The controller circuit 12 may include a processor (not shown) such as a microprocessor or other control circuitry such as analog and/or digital control circuitry. The control circuitry may include one or more application-specific integrated circuits (ASICs) or field programmable gate arrays (FPGAs) that are programmed to perform the techniques, or may include one or more general purpose hardware processors programmed to perform the techniques pursuant to program instructions in firmware, memory, other storage, or a combination. The controller circuit 12 may also combine custom hard-wired logic, ASICs, or FPGAs with custom programming to accomplish the techniques. The controller circuit 12 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying special programming signals. The controller circuit 12 may include other examples of non-volatile memory, such as flash memory, read-only memory (ROM), programmable read-only memory (PROM), and erasable programmable read-only memory (EPROM). The controller circuit 12 may include volatile memory, such as dynamic random-access memory (DRAM), static random-access memory (SRAM). The one or more routines may be executed by the processor to perform steps for determining the speed change response of the operator, based on signals received by the controller circuit 12 from sensors associated with the host vehicle 14 as described herein.

During the learning phase, the controller circuit 12 is configured to identify at least one speed parameter 18 based on the speed change response. In an example, the speed parameter 18 is a timing 20 of the response. In this example, controller circuit 12 determines the timing 20 of the operator adjusting a speed control actuator 22 of the host vehicle 14 in response to the movement of the first vehicle 16. That is, the controller circuit 12 determines an amount of time (i.e. a response time, reaction time, etc.) between the movement of the first vehicle 16, as detected by the system 10, and the operator adjusting the speed control actuator 22. In another example, the speed parameter 18 is a speed rate of change 24. In this example, the controller circuit 12 determines how rapid the speed is changing as the operator is adjusting the speed control actuator 22 in response to the movement of the first vehicle 16. That is, the controller circuit 12 determines how "hard" the operator is braking or accelerating the host vehicle 14. The controller circuit 12 learns the operator's response time and speed control preferences while the host vehicle 14 is under the control of the operator (i.e., the manual driving mode) and stores the speed parameters 18 in the memory of the controller circuit 12 for later application under the autonomous driving mode. This learning feature is beneficial because it enables the automated vehicle to perform as the operator would drive under similar traffic conditions, as the factory programmed speed control parameters may be either too aggressive, or too conservative, for the particular operator and/or passengers of the host vehicle 14. After the learning phase is completed, and when the host vehicle 14 is controlled in the autonomous driving mode, the controller circuit 12 applies the at least one speed parameter 18 based on the movement of a second vehicle 28 traveling on the roadway. That is, the controller circuit 12 applies the learned operator's speed control preferences when the second vehicle 28, that is a different vehicle from the first vehicle 16, performs the cut-in maneuver, or the lane merge maneuver, while the host vehicle 14 is operated in the autonomous driving mode.

In an example, the speed control actuator 22 is a brake pedal of the host vehicle 14. In this example, the controller circuit 12 monitors the speed change response when the operator depresses the brake pedal (i.e., applies the brakes) in response to the movement of the first vehicle 16 (e.g. the cut-in or lane merge), thereby reducing the speed of the host vehicle 14. In another example, the speed control actuator 22 is an accelerator pedal of the host vehicle 14. In this example, the controller circuit 12 monitors the speed change response when the operator changes a position of the accelerator pedal in response to the movement of the first vehicle 16, thereby increasing or decreasing the speed of the host vehicle 14. In yet another example, the speed control actuator 22 is a cruise control switch of the host vehicle 14. In this example, the controller circuit 12 monitors the speed change response when the operator changes a cruise control setting in response to the movement of the first vehicle 16, thereby increasing or decreasing the speed of the host vehicle 14.

Figure 2:
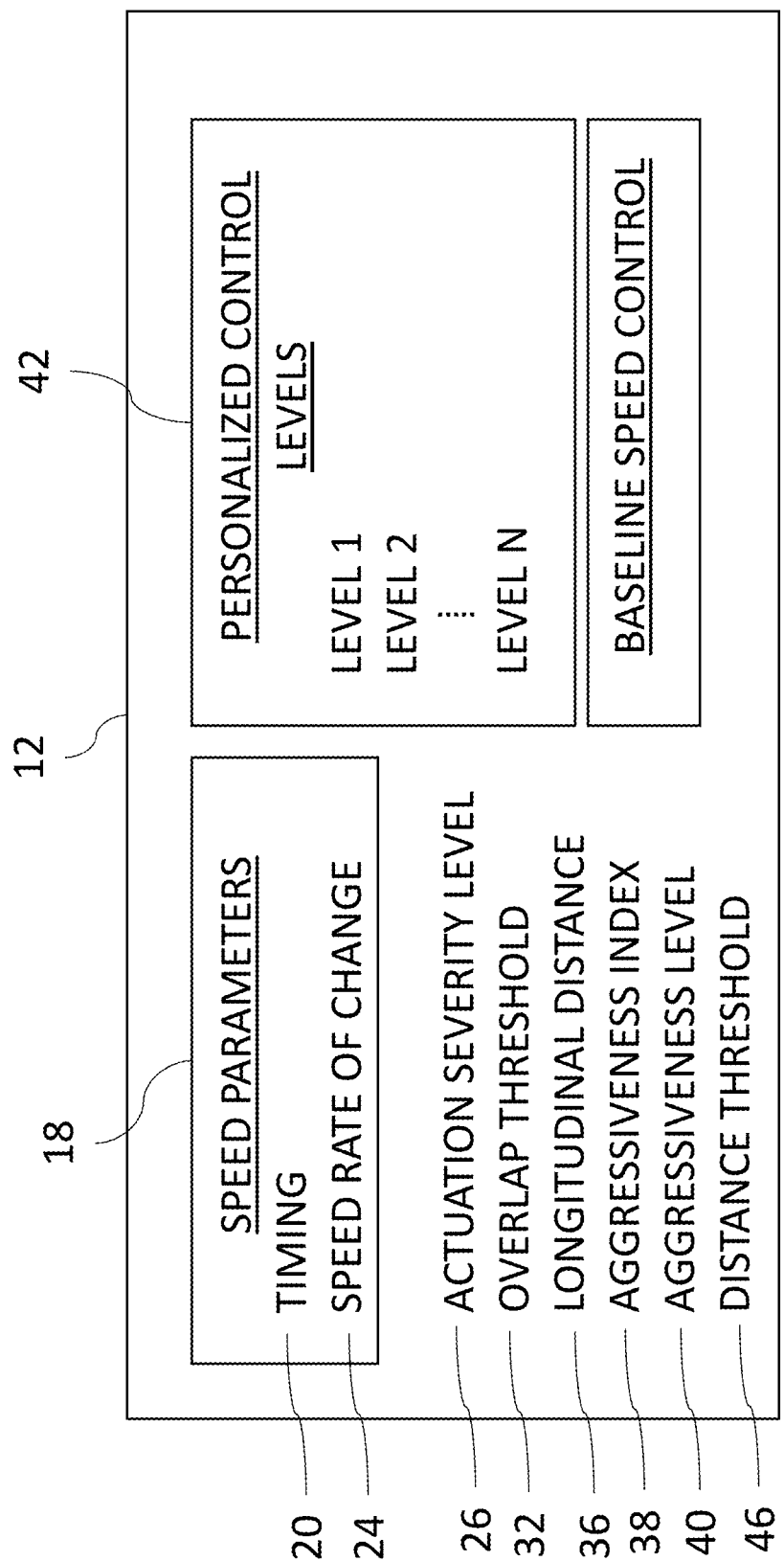
FIG. 2 is an illustration of a controller circuit of the speed control system of FIG. 1 in accordance with one embodiment.

In an example, the controller circuit 12 determines an actuation severity level 26 of the operator adjusting the speed control actuator 22. In the example of the braking actuator, the controller circuit 12 determines a force applied to the braking actuator, and/or a distance the braking actuator is moved (i.e. a pedal travel), and/or how rapidly the operator depresses and/or releases the braking actuator (i.e. a rate of actuation). That is, the actuation severity level 26 indicates how rapidly the operator is depressing, or how rapidly the operator is releasing the brake pedal. In the example of the accelerator pedal, the controller circuit 12 determines the force applied to the accelerator pedal, and/or the distance the accelerator pedal is moved (i.e. the pedal travel), and/or how rapidly the operator depresses and/or releases the accelerator pedal (i.e. the rate of actuation). That is, the actuation severity level 26 indicates how rapidly the operator is depressing or releasing the accelerator pedal. In the example of the cruise control switch, the controller circuit 12 determines whether the switch is moved to increase or decrease the speed setting, and/or the duration of time that the operator actuates the cruise control switch. The controller circuit 12 stores the actuation severity level 26 in the memory associated with the speed parameters 18 for later application under the autonomous driving mode (see FIG. 2).

Figure 3:
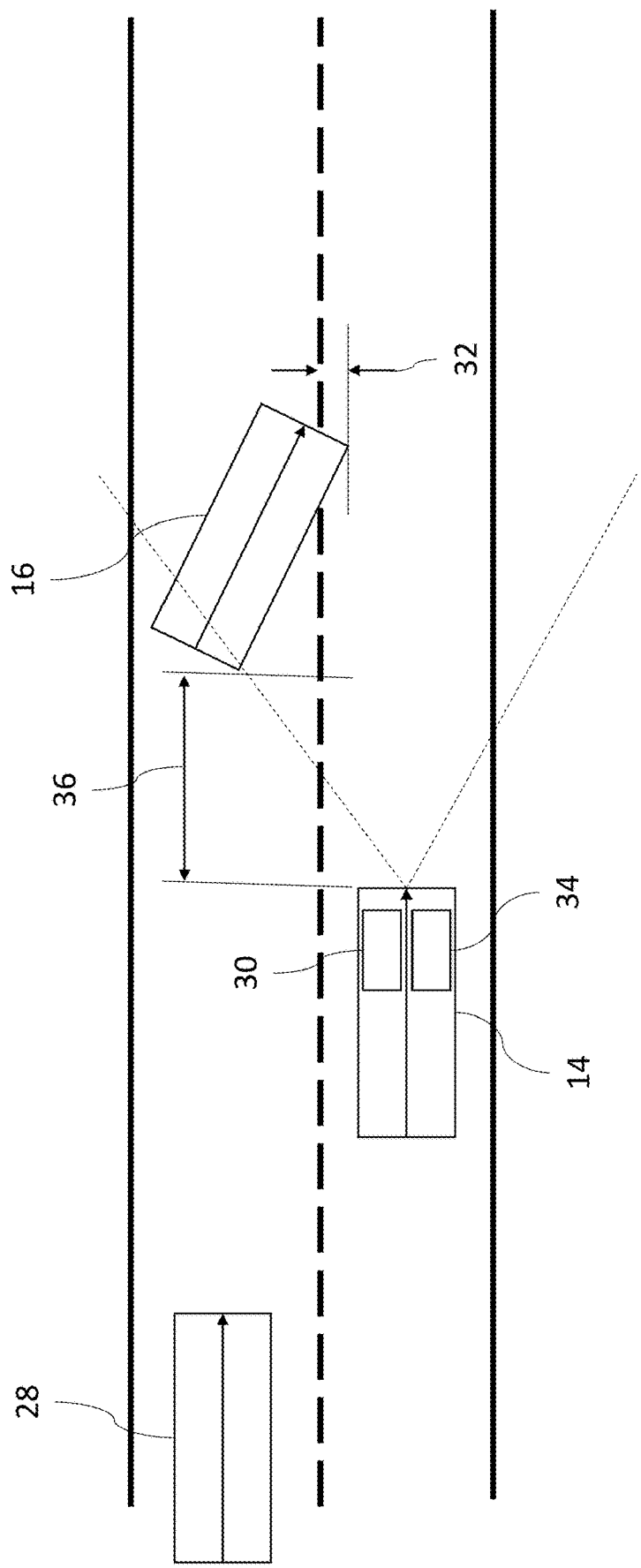
FIG. 3 is an illustration of a traffic scenario in accordance with one embodiment.

FIG. 3 illustrates the traffic scenario of the cut-in maneuver, where the first vehicle 16 (i.e., the cut-in vehicle) is moving into a travel lane traveled by the host vehicle 14, while the host vehicle 14 is operated in the manual driving mode. The arrows in the vehicles indicate a direction of travel. In the example illustrated in FIG. 3, the controller circuit 12 monitors the speed change response of the operator when the controller circuit 12 determines that the first vehicle 16, traveling ahead of the host vehicle 14 and in an adjacent lane, moves from the adjacent lane into the travel lane traveled by the host vehicle 14. The controller circuit 12 determines that the first vehicle 16 enters the travel lane when a portion of the first vehicle 16 overlaps a boundary (e.g., a lane marking) of the travel lane by a predefined distance, typically referred to as an overlap distance. The overlap distance is defined as a lateral distance the first vehicle 16 overlaps the boundary of the travel lane traveled by the host vehicle 14. In the example illustrated in FIG. 3, the overlap distance is measured from the left lane marking (i.e., the dashed lane marking) to a right front corner of the first vehicle 16. The overlap distance is a parameter typically set by the manufacturer used to indicate that another vehicle has actually entered the travel lane, and may be used in various advanced safety vehicle subsystems installed on the host vehicle 14. In an example, the overlap distance set by the manufacturer is in a range of 0 meters (m) to 0.4 m, and may be determined by a camera 30 installed on the host vehicle 14.

The system 10 further includes the camera 30 in communication with the controller circuit 12 that captures images of the roadway traveled by the host vehicle 14. The controller circuit 12 determines that the first vehicle 16 enters the travel lane based on the images that may include, but are not limited to, a position of the first vehicle 16 in relation to the lane markings on a left side and right side of a travel lane of the roadway traveled by the host vehicle 14. The images may also include the lane markings on the left side and the right side of adjacent lanes to the travel lane. The lane markings may include a solid line, as is typically used to indicate the boundary of the travel lane. The lane markings may also include a dashed line, as is also typically used to indicate the boundary of the travel lane. The controller circuit 12 is generally configured (e.g. programmed or hardwired) to determine a width of the travel lane (i.e. a lane width) based on the lane markings detected by the camera 30. That is, the images detected or captured by the camera 30 are processed by the controller circuit 12 using known techniques for image analysis to determine the lane width. Vision processing technologies, such as the EYE Q® platform from Mobileye Vision Technologies, Ltd. of Jerusalem, Israel, or other suitable devices may be used. In an example, the lane width is determined based on a known dimension of the host vehicle 14 that is stored in the memory of the controller circuit 12. In an example, the known lane width is used to determine the overlap distance of the first vehicle 16.

Referring back to FIG. 3, the controller circuit 12 determines an overlap threshold 32 based on the images. The overlap threshold 32 indicates a maximum lateral distance that the first vehicle 16 has overlapped the boundary of the travel lane at the time of the speed change response by the operator. That is, the controller circuit 12 uses the camera 30 to determine how far the first vehicle 16 has moved into the travel lane before the operator responds by changing the speed of the host vehicle 14, such as applying the brakes. The controller circuit 12 stores the overlap threshold 32 in the memory and associates the overlap threshold 32 with the stored speed parameters 18 (e.g., the timing 20 and speed rate of change 24—see FIG. 2).

The system 10 further includes a ranging sensor 34 in communication with the controller circuit 12. The controller circuit 12 is further configured to determine a longitudinal distance 36 between the host vehicle 14 and the first vehicle 16 based on the ranging sensor 34, at the time of the speed change response. The controller circuit 12 uses the longitudinal distance 36, to, among other uses, limit the learning conditions of the system 10, as will be described in more detail below.

Figure 4:
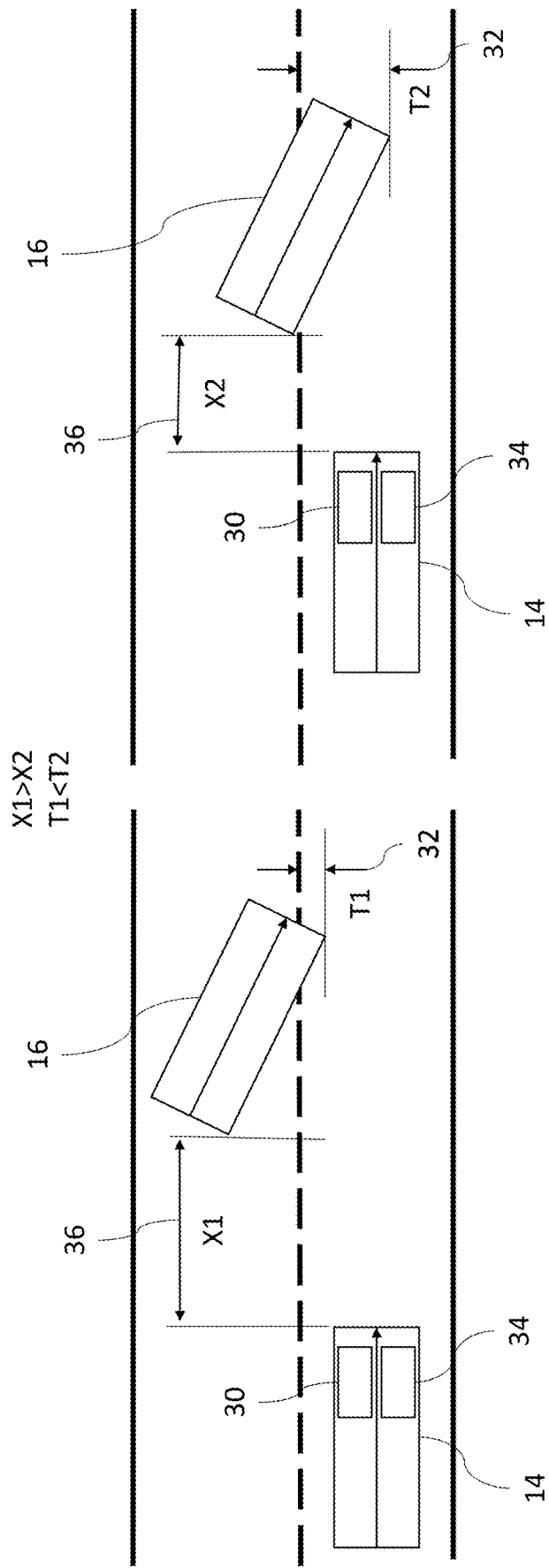
FIG. 4A is an illustration of another traffic scenario in accordance with one embodiment.
FIG. 4B is an illustration of yet another traffic scenario in accordance with one embodiment.

FIGS. 4A-4B illustrate two examples of the operator's speed change response to the cut-in maneuver. In the example illustrated in FIG. 4A, the operator of the host vehicle 14 (driving in the manual mode) applies the brakes when the first vehicle 16 overlaps the dashed lane marking by the overlap threshold 32 of T1. In this example, the controller circuit 12 determines the first vehicle 16 is a longitudinal distance 36 of X1 ahead of the host vehicle 14 at the time the operator applies the brakes. The controller circuit 12 stores the overlap threshold 32 of T1 in the memory of the controller circuit 12, along with the associated longitudinal distance 36 of X1, the speed parameters 18, and the actuation severity level 26, for use later when the host vehicle 14 is operated in the autonomous driving mode. In the example illustrated in FIG. 4B, the operator applies the brakes when the first vehicle 16 overlaps the dashed lane marking by the overlap threshold 32 of T2, where T2 is greater than T1 (i.e., the first vehicle 16 in FIG. 4B is farther into the travel lane before the operator applies the brakes). In this example, the controller circuit 12 determines that the first vehicle 16 is a longitudinal distance 36 of X2 ahead of the host vehicle 14 at the time the operator applies the brakes, where X2 is less than X1. That is, the host vehicle 14 in FIG. 4B is closer to the rear bumper of the first vehicle 16, compared to FIG. 4A, because the operator in FIG. 4B waited a longer time to apply the brakes. The operator in FIG. 4B may be considered a more aggressive driver compared to the operator in FIG. 4A, and/or may be more comfortable allowing the shorter longitudinal distance 36 between the host vehicle 14 and the first vehicle 16 before applying the brakes. In the example illustrated in FIG. 4B, the controller circuit 12 also stores the overlap threshold 32 of T2 in the memory of the controller circuit 12, along with the associated longitudinal distance 36 of X2, the speed parameters 18, and the actuation severity level 26, for use later when the host vehicle 14 is operated in the autonomous driving mode. The controller circuit 12 applies this learning (i.e., reactive learning) when the host vehicle 14 is operated in the autonomous driving mode, and when the second vehicle 28 performs the cut-in maneuver.

In an example, the ranging sensor 34 is a radar sensor. In another example, the ranging sensor 34 is a light detection and ranging (LiDAR) sensor. The ranging sensor 34 is configured to detect objects proximate to the host vehicle 14. In the examples illustrated herein, the ranging sensor 34 is the radar sensor. The radar sensor detects a radar signal that is reflected by the features of the first vehicle 16. Typical radar systems on vehicles are capable of only determining a distance (i.e. range) and azimuth-angle to the target so may be referred to as a two-dimensional (2D) radar system. Other radar systems are capable of determining an elevation angle to the target so may be referred to as a three-dimensional (3D) radar system. The radar sensor may include left sensors and right sensors mounted on both a front and rear of the host vehicle 14. It is contemplated that the teachings presented herein are applicable to both 2D radar systems and 3-D radar systems with one or more sensor devices, i.e. multiple instances of the radar sensor. The radar sensor is generally configured to detect the radar signal that may include data indicative of the detected targets present on the first vehicle 16. As used herein, the detected target present on the first vehicle 16 may be a feature of the first vehicle 16 that is detected by the radar sensor and tracked by the controller circuit 12. In an example, the radar sensor may be configured to output a continuous or periodic data stream that includes a variety of signal characteristics associated with each target detected. The signal characteristics may include or be indicative of, but are not limited to, the range to the target from the host vehicle 14, the azimuth angle (not specifically shown) to the target relative to a host vehicle longitudinal axis, an amplitude of the radar signal, and a relative velocity of closure (i.e. a range rate) relative to the target.

Figure 5:
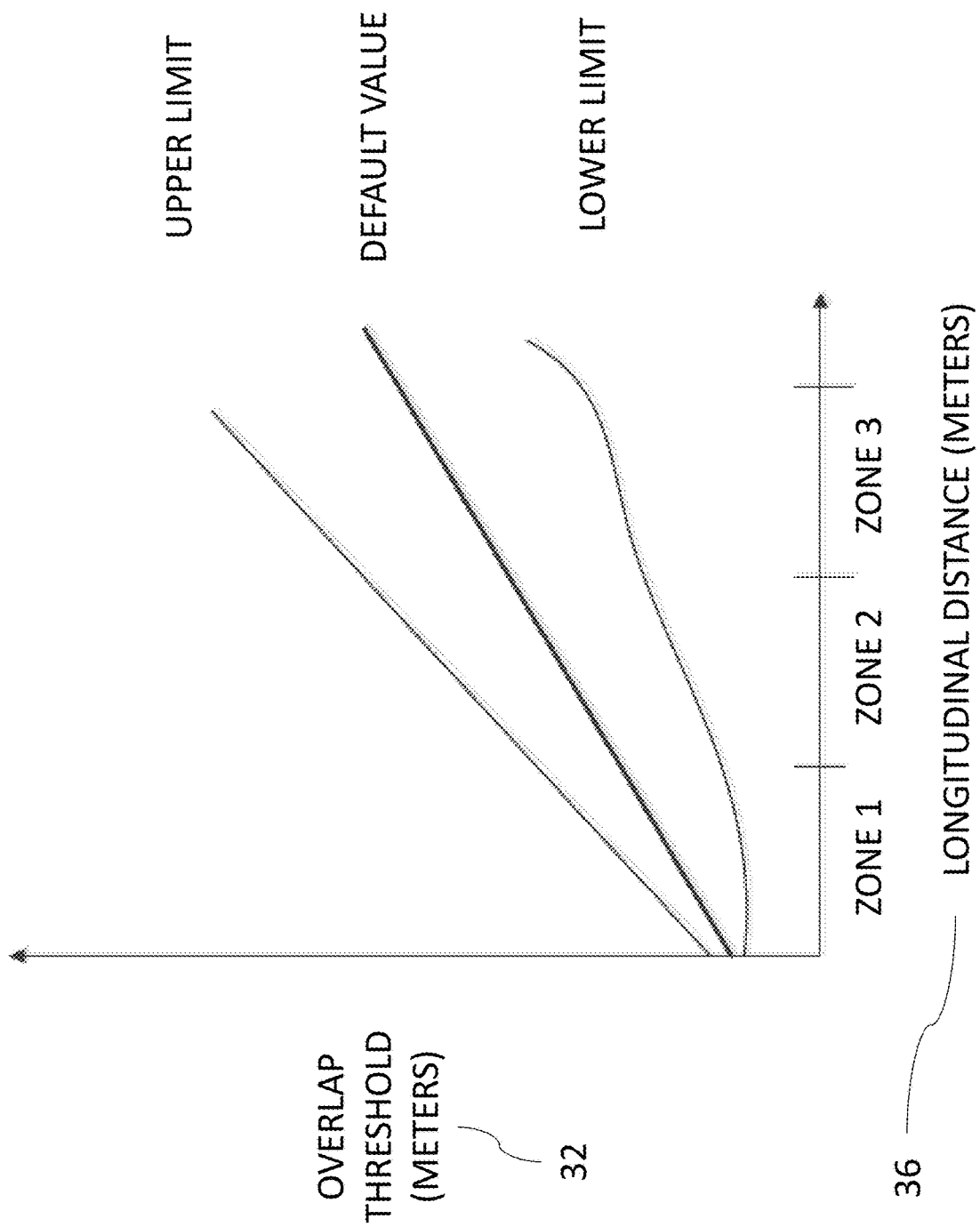
FIG. 5 is a plot of an overlap threshold in accordance with one embodiment.
Figure 6:
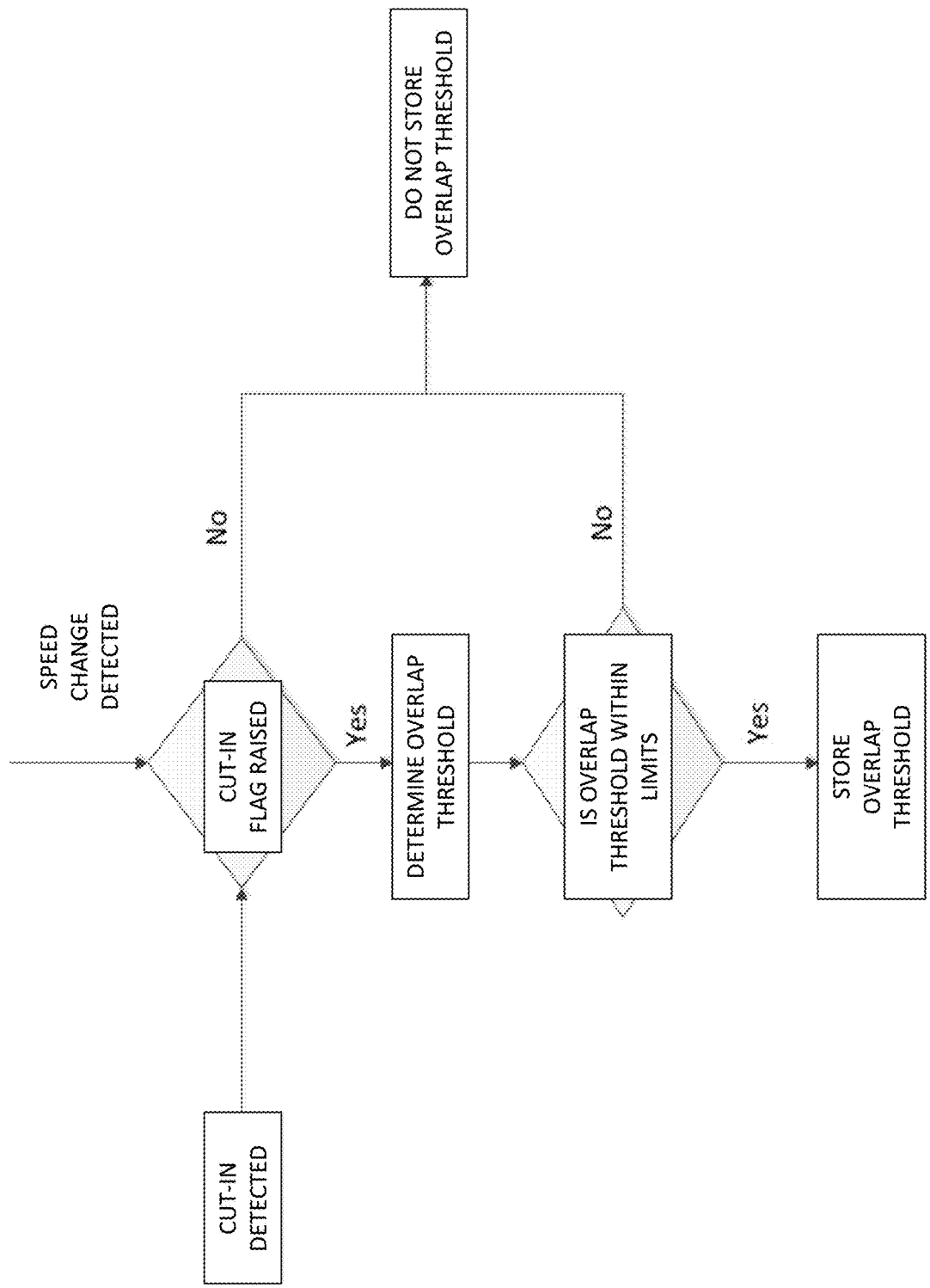
FIG. 6 is a logic flow chart in accordance with one embodiment.

FIG. 5 is a plot that illustrates the learning limitations of the overlap threshold 32. The controller circuit 12 adjusts the overlap threshold 32 based on the longitudinal distance 36 by limiting the learning of the system 10 to longitudinal distances 36 that do not pose a collision risk to the host vehicle 14 and/or the first vehicle 16. The controller circuit 12 is configured to adjust the overlap threshold 32 around a default value between a lower limit and a upper limit based on the longitudinal distance 36 between the host vehicle 14 and the first vehicle 16. That is, once the controller circuit 12 determines that the cut-in event has occurred, the controller circuit 12 determines whether the overlap threshold 32 is within the bounds of the upper and lower limits indicated in FIG. 5. If the overlap threshold 32 is within the upper and lower limits, the controller circuit 12 will store the overlap threshold 32 in the memory for later use during autonomous driving. If the overlap threshold 32 is outside the upper and lower limits, the controller circuit 12 will not store the overlap threshold 32 in the memory. An example of a logic flow of the overlap threshold 32 learning is shown in FIG. 6.

Referring back to FIG. 5, in an example, the line labeled "DEFAULT VALUE", is a starting value that may be set by the original equipment manufacturer (OEM). The longitudinal distance axis of FIG. 5 is divided into three zones. Zone 1 indicates the shortest distance between the host vehicle 14 and the first vehicle 16, and in an example has a range from zero meters (m) to 10 m. Zone 2 has the range of 10 m to 20 m, and zone 3 has the range of 20 m to 30 m. The distance ranges for the various zones may be user defined, and may also vary with the speed of the host vehicle 14 and/or the speed of the first vehicle 16. In an example, the controller circuit 12 ignores the first vehicle's 16 cut-in maneuver at distances beyond zone 3, as it may be unlikely that the operator will respond to such an event with a speed control change. The equations of the lines that define the upper limit, the lower limit, and the default value may be user defined, and may be linear, first order, second order, third order, or any equation as determined by the user. A feature of plot of the lower limit line is that a slope or gain of the line in zone 1 is substantially flatter than the slopes of the default value and upper limit lines. This feature is intended to prevent the system 10 learning any driving behavior that may be considered dangerous and/or too aggressive when the distance between the host vehicle 14 and the first vehicle 16 are within the range of zone 1.

In an example, the controller circuit 12 determines a aggressiveness index 38 of the operator by the equation, $$AGG_{index} = \frac{|a_{bsc}| - |a_{opr}|}{\max(|a_{bsc}|, |a_{opr}|)},$$

where $|a_{bsc}|$ is the absolute value of the baseline speed control maximum acceleration applied during the cut-in event (i.e., the default acceleration set by the OEM), and $|a_{opr}|$ is the absolute value of the operator's maximum acceleration control as learned by the controller circuit 12 in response to the cut-in event, as described above. In an example, the aggressiveness index 38 is typically in a range between −0.5 and +0.5. In this example, if the operator decelerates, or brakes faster than the baseline value, the aggressiveness index 38 will be a negative value. The controller circuit 12 further determines an aggressiveness level 40 of the operator by the equation, $$AGG_{level} = \text{round } [10 \times (AGG_{index} + 0.5)],$$

where the operator "round" is a MATLAB® function developed by the MathWorks, Inc. of Natick, Mass., USA, used to round the calculated value to the nearest decimal or integer. It will be understood that other rounding operators may be used.

The controller circuit 12 stores a plurality of aggressiveness levels in the memory of the controller circuit 12 and applies at least one of the plurality of aggressiveness levels when the host vehicle 14 is controlled in the autonomous driving mode. In an example, the controller circuit 12 stores a plurality of personalized control levels 42 indicative of various operator preferences (see FIG. 2). In an example, the personalized control levels 42 indicate a scale of aggressiveness, with level 1 being the most conservative and level N being the most aggressive. In an example, the levels of aggressiveness may be associated with different operators of the host vehicle 14. In another example, the levels of aggressiveness may be associated with the number occupants of the host vehicle 14, such as whether the operator is accompanied by other passengers, or whether the operator is alone in the host vehicle 14. It will be appreciated that an operator may exhibit different speed control preferences when driving alone, compared to when driving with passengers. In an example, system 10 further includes an occupant recognition system and the controller circuit 12 applies the at least one speed parameter 18 based on a recognition of the occupants of the host vehicle 14. In an example, the occupant recognition system uses biometric features, such as facial and or retinal recognition of the occupants, via a camera that monitors a passenger compartment of the host vehicle 14. In another example, the occupant recognition system uses a pressure exerted on seats in the passenger compartment to detect a location and number of passengers in the host vehicle 14. In an example, the controller circuit 12 applies one of the personalized control levels 42 when the host vehicle 14 is controlled in the autonomous driving mode, based on the recognition of the operator and/or occupants of the host vehicle 14, when the second vehicle 28 performs the cut-in or the lane merge maneuver.

Figure 7:
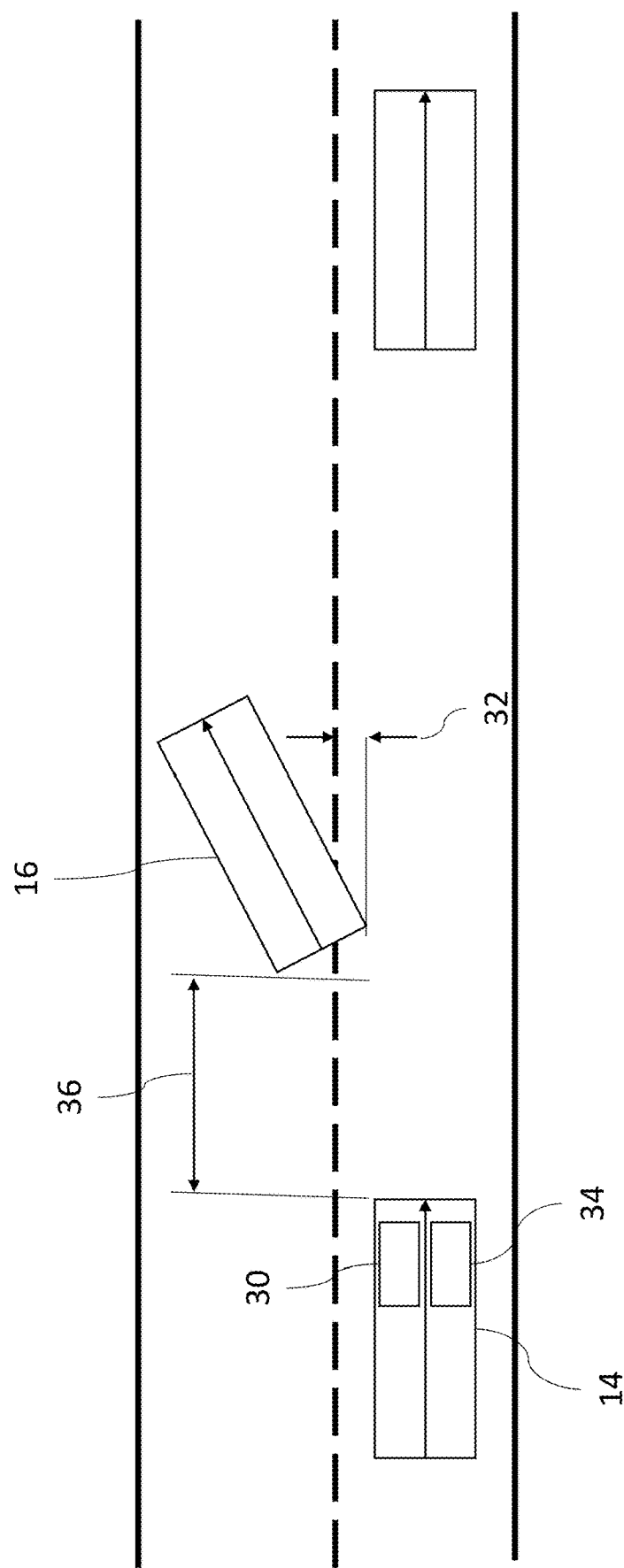
FIG. 7 is an illustration of yet another traffic scenario in accordance with one embodiment.

While the system 10 has been described above in reference to the cut-in maneuver, it will be appreciated that the system 10 applies to the traffic scenario where the first vehicle 16, traveling ahead of the host vehicle 14, moves out from the travel lane traveled by the host vehicle 14 into an adjacent lane (i.e., a cut-out maneuver—see FIG. 7). In this example, the controller circuit 12 monitors the speed change response of the operator when the controller circuit 12 determines that the first vehicle 16 performs the cut-out maneuver. In this example, the operator of the host vehicle 14 may respond by increasing the speed of the host vehicle 14 to pass the first vehicle 16. The controller circuit 12 stores the learned parameters in the memory, as described above for the cut-in maneuver, and applies the learning when the host vehicle 14 is operated in the autonomous driving mode, and the second vehicle 28 performs the cut-out maneuver.

Figure 8:
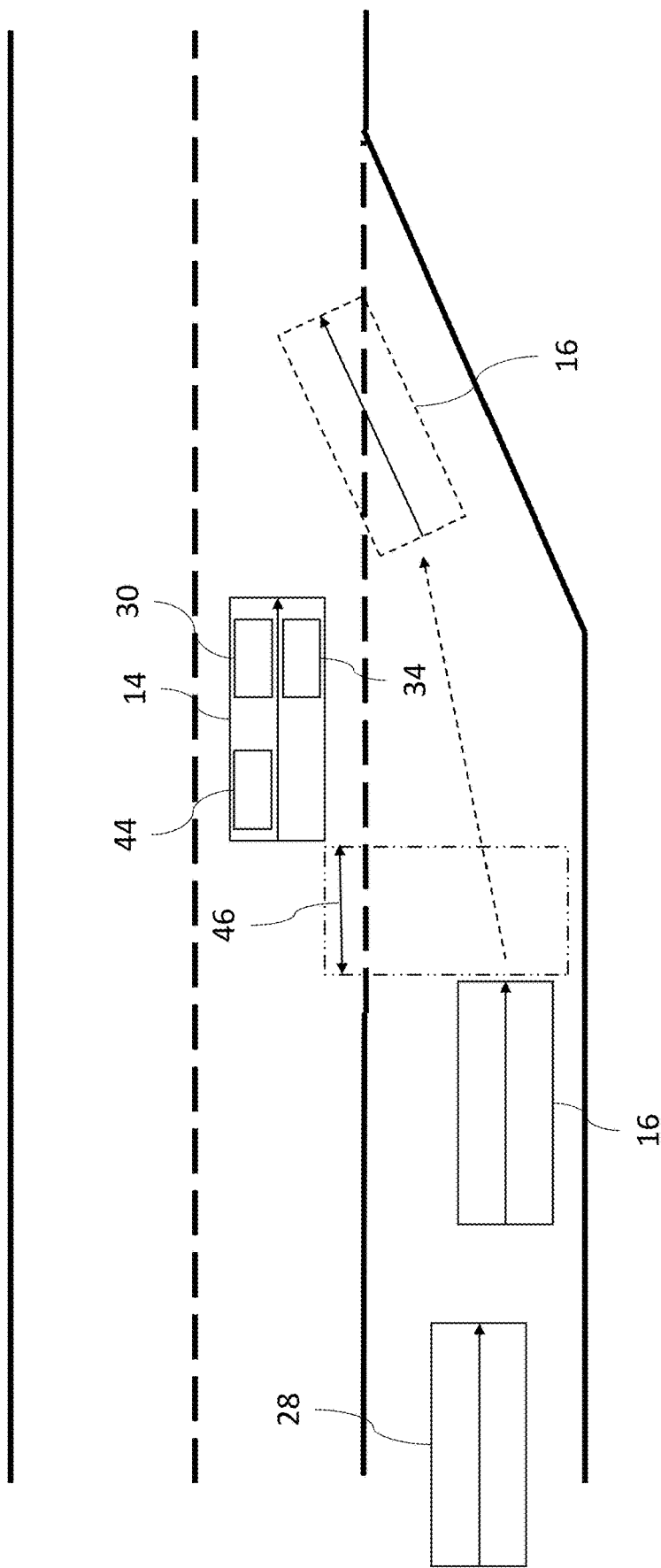
FIG. 8 is an illustration of yet another traffic scenario in accordance with one embodiment.

FIG. 8 illustrates the traffic scenario where the first vehicle 16, traveling in the merge lane adjacent to the travel lane traveled by the host vehicle 14, performs the lane merge maneuver. In this example, the controller circuit 12 monitors the speed change response of the operator when the controller circuit 12 determines that the first vehicle 16, traveling in the merge lane adjacent to the host vehicle 14, intends to merge in front of the host vehicle 14. In the example illustrated in FIG. 8, the first vehicle 16, while traveling in the merge lane, is overtaking the host vehicle 14 from behind. That is, the first vehicle 16 is traveling faster than the host vehicle 14 and will pass the host vehicle 14 before merging into the travel lane ahead of the host vehicle 14. In response to the impending lane merge, the operator may apply the brakes to slow the host vehicle 14 and allow the first vehicle 16 to merge into the travel lane ahead of the host vehicle 14.

In an example, the system 10 further includes a merge lane detector 44 in communication with the controller circuit 12. The merge lane detector 44 determines the presence of the merge lane adjacent to the travel lane, and the ranging sensor 34 detects the range and range rate of the first vehicle 16 traveling in the merge lane. The controller circuit 12 is further configured to determine that the first vehicle 16 will merge into the travel lane based on the merge lane detector 44 and the ranging sensor 34. In an example, the merge lane detector 44 is a digital map that indicates the merge lane relative to a position of the host vehicle 14 on the roadway. The digital map may be located on-board the host vehicle 14 and may be integrated into the controller circuit 12. The digital map may be stored 'in the cloud' and accessed via a transceiver (e.g. Wi-Fi, cellular, satellite—not shown). The digital map and transceiver may also be part of a location-device (e.g. a global positioning system (GPS)—not shown). In another example, the merge lane detector 44 is the camera 30 that indicates the merge lane based on images of lane markings on the roadway. In yet another example, the merge lane detector 44 is a combination of the digital map and the camera 30.

In an example, the controller circuit 12 further determines a buffer zone directly behind the host vehicle 14. The buffer zone includes an area extending laterally into the merge lane from a rear of the host vehicle 14 to a distance threshold 46 along the longitudinal axis of the host vehicle 14. In an example, the distance threshold 46 is initially set to 5 m. In another example, the distance threshold 46 varies with the speed of the host vehicle 14. In an example, the controller circuit 12 monitors the speed change response by the operator when the first vehicle 16 enters the buffer zone. The controller circuit 12 learns the operator's preference for braking for the merging first vehicle 16 while the host vehicle 14 is operated in the manual driving mode. The controller circuit 12 then applies this learning (i.e., anticipatory learning) when the host vehicle 14 is operated in the autonomous driving mode, and when the second vehicle 28 performs the lane merge maneuver.

Figure 9:
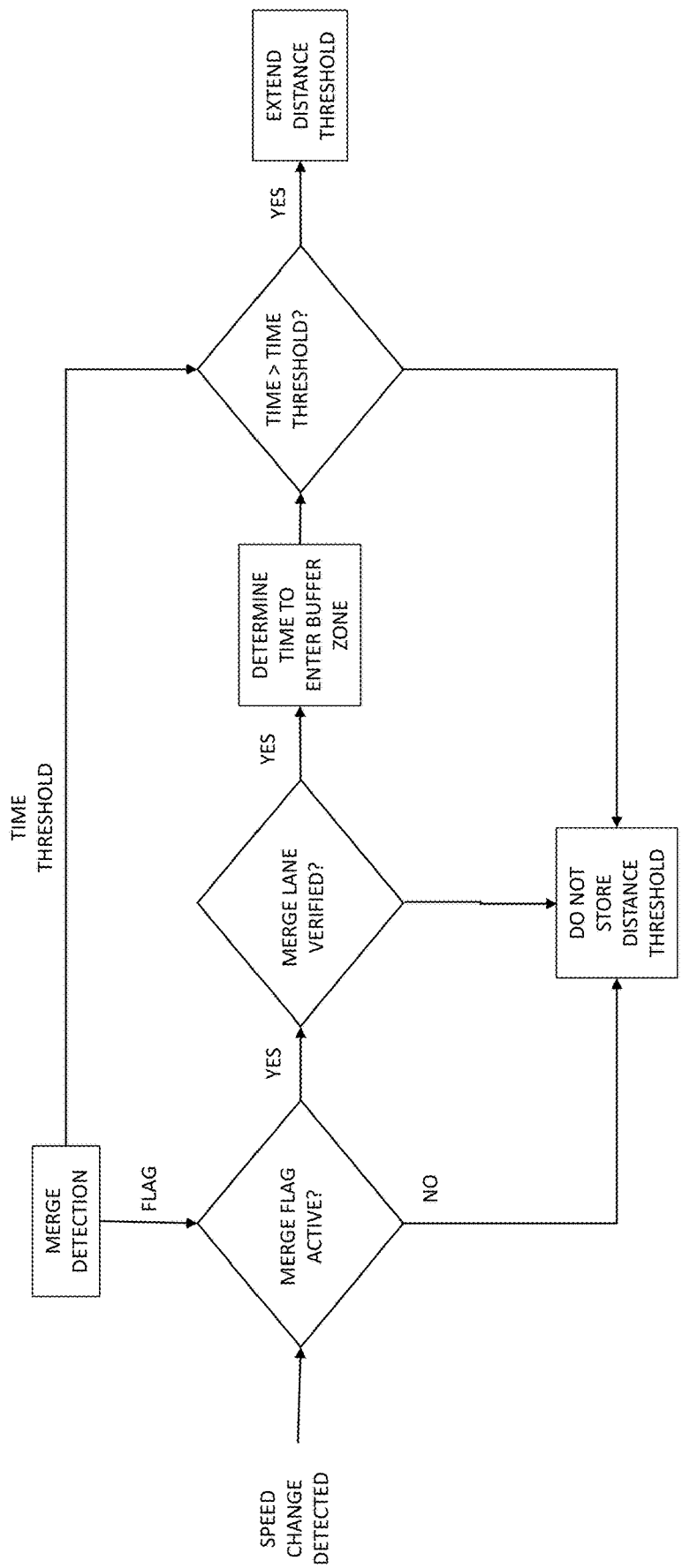
FIG. 9 is another logic flow chart in accordance with one embodiment.

The controller circuit 12 further determines a time in which the first vehicle 16 will enter the buffer zone based on the range and the range rate of the approaching first vehicle 16 and the distance threshold 46. When the time in which the first vehicle 16 will enter the buffer zone is greater than a time threshold, the controller circuit 12 increases the distance threshold 46 such that the time in which the first vehicle 16 will enter the buffer zone is equal to the time threshold. In an example, the time threshold is set at 3 seconds. In this example, the controller circuit 12 determines, based on the radar sensor data, that the first vehicle 16 will enter the buffer zone, with the distance threshold 46 initially set to 5 m, in 6 seconds. In this example, the controller circuit 12 then lengthens the distance threshold 46 so that the first vehicle 16 will enter the buffer zone in 3 seconds. It will be understood that the adjusted length of the distance threshold 46 will depend on the speeds of the host vehicle 14 and the first vehicle 16. The time threshold may be any time and may be user defined. The time threshold may vary with the speeds of the host vehicle 14 and/or the speed of the first vehicle 16. The controller circuit 12 stores a plurality of distance thresholds 46 in a memory of the controller circuit 12 and applies at least one of the plurality of distance thresholds 46 when the host vehicle 14 is controlled in the autonomous driving mode, and when the second vehicle 28 performs the lane merge maneuver. In an example, the plurality of distance thresholds 46 are included in the plurality of personalized control levels 42 indicative of various operator preferences, as described above. In an example the controller circuit 12 may apply the learned distance thresholds 46 based on the occupant recognition, as described above. An example of the logic flow of the distance threshold 46 learning is shown in FIG. 9.

While the examples described above disclose the learning of the operator's preferences being applied to a particular host vehicle 14, in an example the controller circuit 12 is further configured to apply the at least one speed parameter 18 when the operator is an occupant of another vehicle controlled in the autonomous driving mode. In an example, the operator may employ a ride sharing vehicle (e.g., a rental car, etc.) and may wish to have their speed control preferences applied to the ride sharing vehicle. The controller circuit 12 of the ride sharing vehicle may download an operator profile supplied by the operator to transfer the operator's speed control preferences to the ride sharing vehicle. In an example, the operator's preferences may be shared through a mobile application installed on the operator's mobile device. In another example, the operator's preferences may be downloaded through a cloud based server. The ride sharing vehicle may apply the operator's speed control preferences when the ride sharing vehicle is operated in the autonomous driving mode, when the second vehicle 28 performs the cut-in and/or lane merge maneuvers.

Figure 10:
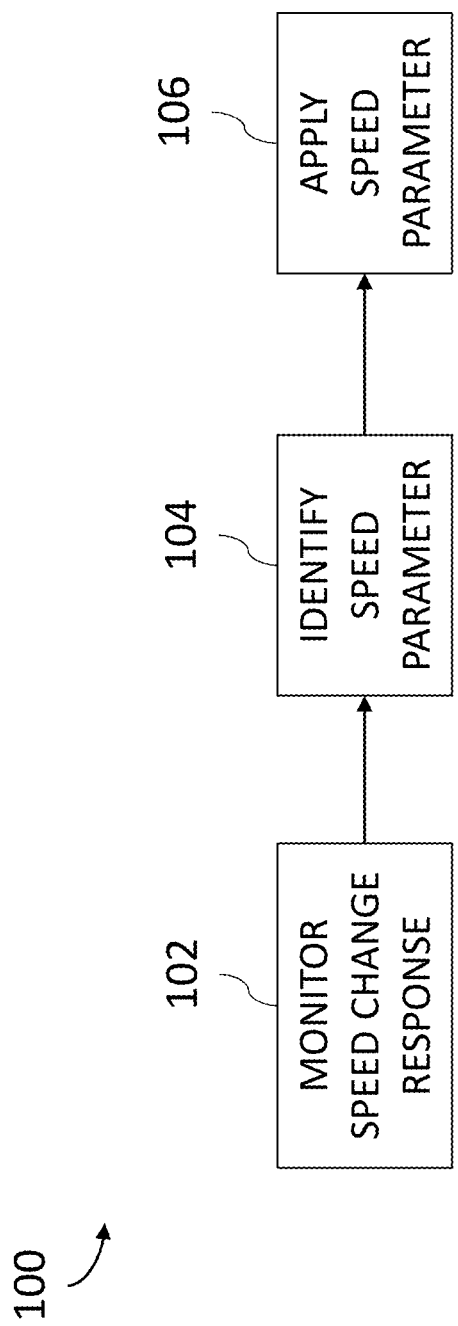
FIG. 10 is flow chart of a method of operating the speed control system of FIG. 1 in accordance with another embodiment.

FIG. 10 is a flow chart of a method 100 of operating the system 10.

Step 102, MONITOR SPEED CHANGE RESPONSE, includes monitoring, with the controller circuit 12 while the host vehicle 14 is operated in a manual driving mode, the speed change response of the operator of the host vehicle 14 based on the movement of a first vehicle 16 traveling on the roadway. The controller circuit 12 determines a movement of the first vehicle 16 traveling on the roadway, as described above. The controller circuit 12 monitors the operator changing a speed of the host vehicle 14, and associates the operator's response with the movement of the first vehicle 16, as described above.

Step 104, IDENTIFY SPEED PARAMETER, includes identifying, with the controller circuit 12, at least one speed parameter 18 based on the speed change response, as described above. The speed parameters 18 include the timing 20 of the response and the speed rate of change 24 of the host vehicle 14, as described above. The controller circuit 12 determines the timing 20 of the operator adjusting the speed control actuator 22 of the host vehicle 14 in response to the movement of the first vehicle 16, as described above. The speed control actuator 22 is one of a brake pedal, an accelerator pedal, and a cruise control switch. The controller circuit 12 learns the operator's response time and speed control preferences (i.e. reactive learning and/or anticipatory learning) while the host vehicle 14 is under the control of the operator (i.e., the manual driving mode) and stores the speed parameters 18 in the memory for later application under the autonomous driving mode.

Step 106, APPLY SPEED PARAMETER, includes applying with the controller circuit 12, when the host vehicle 14 is controlled in an autonomous driving mode, the at least one speed parameter 18 based on the movement of a second vehicle 28 traveling on the roadway. That is, the controller circuit 12 applies the learned operator's speed control preferences when the second vehicle 28, that is a different vehicle from the first vehicle 16, performs the cut-in maneuver, the cut-out maneuver, or the lane merge maneuver while the host vehicle 14 is operated in the autonomous driving mode, as described above.

Accordingly, a vehicle system 10 and a method 100 of operating the vehicle system 10 are provided. The vehicle system 10 may provide advantages over other systems because the vehicle system 10 enables the automated vehicle to perform as the operator would drive under similar traffic conditions, as the factory programmed speed control parameters may be either too aggressive, or too conservative, for the particular operator and/or passengers of the host vehicle 14.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A system comprising:
   a controller circuit configured to:
   monitor, when a host vehicle is under control of an operator in a manual or semi-autonomous driving mode, sensor data of a roadway captured by a sensor of the host vehicle for identifying a speed change response of the host vehicle due to a movement of a first vehicle traveling on the roadway that causes the first vehicle to enter, from an adjacent lane, a travel lane ahead of the host vehicle;
   identify, based on the speed change response, at least one speed parameter and an overlap threshold indicating a maximum lateral distance that the first vehicle overlaps a boundary of the travel lane when the speed change response is identified; and
   apply, when the host vehicle is operated in an autonomous driving mode, the overlap threshold and the at least one speed parameter to control the host vehicle in response to movement of a second vehicle traveling on the roadway when the movement of the second vehicle approximates the movement of the first vehicle when the speed change response is identified.

2. The system of claim 1, wherein the at least one speed parameter is one of a timing or a speed rate of change.

3. The system of claim 2, wherein the controller circuit is further configured to identify the at least one parameter by determining the timing based on the operator adjusting a speed control actuator of the host vehicle.

4. The system of claim 3, wherein the speed control actuator comprises at least one of a brake pedal, an accelerator pedal, or a cruise control switch.

5. The system of claim 3, wherein the controller circuit further is further configured to determine an actuation severity level of the adjustment of the speed control actuator.

6. The system of claim 2, wherein the controller circuit is further configured to apply the at least one speed parameter to control the host vehicle in the autonomous mode further based on a recognition of occupants of the host vehicle by an occupant recognition system.

7. The system of claim 1, wherein the controller circuit is further configured to apply the at least one speed parameter to control another vehicle in the autonomous driving mode when the operator is an occupant of the other vehicle.

8. The system of claim 1, wherein the sensor comprises a camera in communication with the controller circuit, the camera configured to capture at least some of the sensor data of the roadway that includes images of the roadway traveled by the host vehicle.

9. The system of claim 1, wherein the sensor comprises a ranging sensor in communication with the controller circuit, the controller circuit being further configured to:
determine, based on at least some of the sensor data of the roadway that includes range data of the roadway captured by the ranging sensor, a longitudinal distance between the host vehicle and the first vehicle; and
adjust the overlap threshold based on the longitudinal distance.

10. The system of claim 1, wherein the controller circuit is further configured to adjust the overlap threshold between a lower limit and an upper limit based on a longitudinal distance between the host vehicle and the first vehicle.

11. The system of claim 1, wherein the controller circuit is further configured to determine an aggressiveness index of the operator by the equation $$AGG_{index} = \frac{|a_{bsc}| - |a_{opr}|}{\max(|a_{bsc}|, |a_{opr}|)}.$$

12. The system of claim 11, wherein the controller circuit is further configured to determine an aggressiveness level of the operator by the equation $$AGG_{level} = \text{round}[10 \times (AGG_{index} + 0.5)].$$

13. The system of claim 12, wherein the controller circuit is further configured to:
store, in a memory, the aggressiveness level as one of a plurality of aggressiveness levels; and
apply at least one of the plurality of aggressiveness levels to further control the host vehicle in the autonomous driving mode.

14. The system of claim 1, wherein the controller circuit is configured to monitor the sensor data for identifying the speed change response by determining that the adjacent lane comprises a merge lane adjacent to the travel lane of host vehicle.

15. The system of claim 14, wherein the first vehicle is overtaking the host vehicle from behind just prior to the movement of the first vehicle that causes the first vehicle to enter the travel lane ahead of the host vehicle.

16. The system of claim 14, wherein the sensor comprises a merge lane detector and a ranging sensor in communication with the controller circuit the controller circuit is further configured to:
determine that the first vehicle is to merge into the travel lane based on:
a presence of the merge lane adjacent to the travel lane determined by at least some of the sensor data obtained by the merge lane detector; and
a range and a range rate of the first vehicle in the merge lane determined by at least some of the sensor data obtained by the ranging sensor.

17. The system of claim 16, wherein the merge lane detector comprises a digital map configured to indicate the merge lane in the at least some of the sensor data obtained by the merge lane detector.

18. The system of claim 16, wherein the merge lane detector comprises a camera configured to indicate the merge lane based on images of lane markings on the roadway in the at least some of the sensor data obtained by the merge lane detector.

19. The system of claim 16, wherein the controller circuit is further configured to determine a buffer zone behind the host vehicle, the buffer zone comprising an area extending laterally into the merge lane from a rear portion of the host vehicle to a distance threshold along a longitudinal axis of the host vehicle.

20. The system of claim 19, wherein the controller circuit is further configured to determine a time for the first vehicle to enter the buffer zone based on the range and the range rate.

21. The system of claim 20, wherein, when the time for the first vehicle to enter the buffer zone is greater than a time threshold, the controller circuit is further configured to increase the distance threshold such that the time for the first vehicle to enter the buffer zone is equal to the time threshold.

22. The system of claim 21, wherein the controller circuit is further configured to:
store, in a memory, the distance threshold as one of a plurality of distance thresholds; and
apply at least one of the plurality of distance thresholds to further control the host vehicle in the autonomous driving mode.

23. A method comprising:
monitoring, with controller circuit when a host vehicle is operated in a manual or semi-autonomous driving mode, sensor data of a roadway captured by a sensor of the host vehicle for identifying a speed change response of the host vehicle due to a movement of a first vehicle traveling on the roadway that causes the first vehicle to enter, from an adjacent lane, a travel lane ahead of the host vehicle;
identifying, with the controller circuit and based on the speed change response, at least one speed parameter and an overlap threshold indicating a maximum lateral distance that the first vehicle overlaps a boundary of the travel lane when the speed change response is identified; and
applying, with the controller circuit, when the host vehicle is operated in an autonomous driving mode, the overlap threshold and the at least one speed parameter to control the host vehicle in response to movement of a second vehicle traveling on the roadway when the movement of the second vehicle approximates the movement of the first vehicle when the speed change response is identified.

24. The method of claim 23, wherein the at least one speed parameter is one of a timing or a speed rate of change.

25. The method of claim 24, wherein identifying the at least one parameter further comprises determining the timing based on the operator adjusting a speed control actuator of the host vehicle.

26. The method of claim 25, wherein the speed control actuator comprises at least one of a brake pedal, an accelerator pedal, or a cruise control switch.

27. A system comprising:
  means for monitoring, when a host vehicle is operated in a manual or semi-autonomous driving mode, sensor data of a roadway captured by a sensor of the host vehicle for identifying a speed change response of the host vehicle due to a movement of a first vehicle traveling on the roadway that causes the first vehicle to enter, from an adjacent lane, a travel lane ahead of the host vehicle;
  means for identifying, based on the speed change response, at least one speed parameter and an overlap threshold indicating a maximum lateral distance that the first vehicle overlaps a boundary of the travel lane when the speed change response is identified; and
  means for applying, when the host vehicle is operated in an autonomous driving mode, the overlap threshold and the at least one speed parameter to control the host vehicle in response to movement of a second vehicle traveling on the roadway when the movement of the second vehicle approximates the movement of the first vehicle when the speed change response is identified.

28. The system of claim 27, wherein the sensor data comprises images of the roadway captured by a camera of the host vehicle.

29. The system of claim 27, wherein the sensor data comprises range data of the roadway captured by a ranging sensor of the host vehicle, and the means for identifying the at least one speed parameter and the overlap threshold comprise:
  means for determining a longitudinal distance between the host vehicle and the first vehicle based on the range data; and
  means for adjusting the overlap threshold based on the longitudinal distance.

* * * * *